United States Patent
Ricketts et al.

[11] Patent Number: 5,967,860
[45] Date of Patent: Oct. 19, 1999

[54] ELECTROPLATED AG-NI-C ELECTRICAL CONTACTS

[75] Inventors: Mark Ricketts, Windsor, Canada; Dexter Dean Snyder, Birmingham; Robert F. Paluch, Allenton, both of Mich.; Mordechay Schlesinger, Pittsburgh, Pa.; Chi Hung Leung, Rochester Hills, Mich.

[73] Assignee: General Motors Corporation, Detroit, Mich.

[21] Appl. No.: 08/862,767

[22] Filed: May 23, 1997

[51] Int. Cl.⁶ .............................. H01R 13/03; C22C 5/06
[52] U.S. Cl. ...................... 439/886; 439/887; 420/501; 428/673; 428/929
[58] Field of Search ..................... 428/634, 673, 428/675, 935, 929; 420/501; 205/109, 238; 439/886, 887, 874

[56] References Cited

U.S. PATENT DOCUMENTS

| | | | |
|---|---|---|---|
| 3,226,517 | 12/1965 | Schreiner | 200/166 |
| 4,162,160 | 7/1979 | Witter | 75/246 |
| 4,529,667 | 7/1985 | Shiga et al. | 428/646 |
| 4,699,763 | 10/1987 | Sinharoy et al. | 419/11 |
| 4,834,939 | 5/1989 | Bornstein | 419/21 |
| 4,954,170 | 9/1990 | Fey et al. | 419/12 |
| 5,139,890 | 8/1992 | Cowie et al. | 428/670 |
| 5,246,480 | 9/1993 | Haufe et al. | 75/236 |
| 5,416,292 | 5/1995 | Behnke et al. | 200/19 R |
| 5,679,471 | 10/1997 | Cheng et al. | 428/673 |

FOREIGN PATENT DOCUMENTS

| | | | |
|---|---|---|---|
| 49-11973 | 3/1974 | Japan | 420/501 |
| 55-138044 | 10/1980 | Japan | 420/501 |
| 59-159950 | 9/1984 | Japan | 420/501 |
| 61-130442 | 6/1986 | Japan | 420/501 |
| 61-130446 | 6/1986 | Japan | 420/501 |
| 61-130448 | 6/1986 | Japan | 420/501 |
| 61-147827 | 7/1986 | Japan | 420/501 |
| 306506 | 6/1971 | U.S.S.R. | 439/887 |

OTHER PUBLICATIONS

Wise, Electrical Contacts, Development & Research Div, The International Nickel Co, Inc OSRD #5163, Ser. #M–499, Copy #40 (May 30, 1945)pp. 36–37, 94.

Electrical Contacts, Fansteel Metallurgical Corp, North Chicago, IL, copyright 1950 (No Month) pp. 11–12, 20–21, 26.

Burkat et al, Electrodeposition of Silver–Nickel Alloys, Translated from Zhurnal Prikladnoi Khimii, vol. 41, No. 2, pp. 427–430 (Feb. 1968).

*Primary Examiner*—John J. Zimmerman
*Attorney, Agent, or Firm*—Lawrence B. Plant

[57] ABSTRACT

Nesting electrical connectors comprising a substrate and a silver-nickel-carbon electrodeposit atop the substrate. The electrodeposit is at least about 0.5 micrometers thick, and comprises about 10 to about 25 atomic percent nickel which is dispersed as a discontinuous phase throughout a continuous phase of the silver and has a Scherrer grain size less than about 5 nanometers. The carbon comprises about 5 to about 15 atomic percent of the deposit and has a non-crystalline graphite structure.

3 Claims, 8 Drawing Sheets

ELECTROPLATED AG-NI-C ELECTRICAL CONTACTS

TECHNICAL FIELD

The present invention relates to electrical contacts for nesting electrical connectors. More particularly, this invention relates to electrical contacts having an ultra fine grain, electrodeposited silver-nickel-carbon coating thereon for prolonged fretting wear durability at elevated temperatures.

BACKGROUND OF THE INVENTION

Automobiles have a continuing need for durable, low-resistance, economical and environment-resistant nesting electrical connectors. By nesting electrical connectors is meant electrical connectors which are characterized by male and female components/contacts which mate with each other such that the female component/contact engages the male component/contact sufficiently to prevent unintentional separation thereof yet permit easy coupling and decoupling thereof by simply pushing or pulling the components apart respectively. Typically, the male component/contact will comprise a blade, pin or the like, and the female component/contact will comprise a complementarily shaped sheath or socket for receiving the blade/pin. The basic requirements for such electrical connectors are that they have (1) a minimal engagement force between the mating contact components/contacts for ease of coupling/decoupling thereof, (2) low contact electrical resistance achievable by utilizing high contact forces, and environment-resistant materials, (3) the capability of multiple couplings/decouplings through the use of wear resistant materials, and (4) prolonged durability (i.e., fretting wear resistance) under micro-rubbing conditions at vehicle engine compartment temperatures. "Micro rubbing" is a condition that occurs in connectors used in vehicular applications such as cars, trucks or the like that undergo considerable vibration, jouncing and thermal cycling while in service which causes the components/contacts of the connector set to minutely move relatively to each other so as to promote fretting wear of the mating surfaces of the contacts.

Copper, its alloys, and stainless steel are often used to form vehicular current-carrying connector components. Copper and its alloys are preferred because of their low electrical resistance. However, copper is prone to oxidation which significantly increases the electrical resistance across the mating contact surfaces (i.e., the contact resistance). Accordingly, various coatings have been proposed for electrical contacts that serve to enhance the electrical conductivity as well as the temperature, chemical and wear resistance of the contact surface. Unfortunately coatings which are effective at low (e.g., ambient) temperature are often ineffective at engine compartment temperatures. A commonly used such coating is electroplated tin. However, tin coatings have a relatively high coefficient of friction making coupling and decoupling of the connector components/contacts difficult. Moreover, tin limits the use of electrical connectors made therewith to temperatures below about 125° C. due to the tendency for interdiffusion of tin and copper which has a deleterious affect on the connector. As engine compartments become more compact, and underhood temperatures commonly exceed 180° C., the relative number of underhood applications that are incompatible with tin-coated contacts is increasing. Electroplated silver has been used as a high temperature coating material for electrical connector applications (e.g, see Cowie et al U.S. Pat. No. 5,139,890). However, to be effective over a prolonged period of use, silver coatings have had to have thicknesses generally greater than about 2.5 microns. In this regard, silver coatings are relatively soft, and hence prone to erosion, particularly at temperatures above about 180° C. Coatings that are too thin can readily wear through and cause early exposure of the underlying metal to oxidation which can produce a high coefficient of friction, and/or a high contact resistance. Multilayer coating systems that employ silver and its alloys as the contact surface for high temperature applications have been proposed. For example, U.S. Pat. No. 4,529,667 to Shiga et al teaches a three layer electroplated coating system comprising a bottom layer of nickel, cobalt, chromium or palladium alloy, an intermediate layer of tin, cadmium, palladium or ruthenium alloy, and a top layer of a silver alloy. Rubbing movement of the connectors components/contacts together can eventually cause thin connector coatings, used heretofore, to fail and dramatically increase the contact resistant between the mating components which can ultimately result in circuit malfunction.

Copending United States patent application Cheng et al U.S. Ser. No.08/543,660 filed Oct. 16, 1995 now U.S. Pat. No. 5,679,471 and assigned to the assignee of the present invention discloses a thin, wear resistant, low friction, corrosion resistant, vapor-deposited silver-nickel coating for the contacts of nesting electrical connectors, which coatings comprise a nanocomposite of nickel-rich and silver-rich phases having a grain size greater than about 5 nanometers.

The present invention is directed to an electrodeposited silver-nickel-carbon nanocomposite coating which has the low friction and corrosion resistance of Cheng et al's Ag—Ni vapor deposited coating, but which is significantly more durable (i.e., more wear resistant) at elevated temperatures than Cheng et al's coating, as well as being easier and cheaper to form.

SUMMARY OF THE INVENTION

The present invention comprehends a nesting electrical connector having a set of mating electrical contacts each of which comprises a metal substrate having an electrodeposited silver-nickel-carbon coating thereon. The Ag—Ni—C coating has a thickness of at least about 0.5 micrometer, and preferably less than about 2 micrometers. The coating preferably has a nickel content of about 10 atomic percent (a/o) to about 25 atomic percent, and a carbon content of about 5 a/o to about 15 a/o. Nanometer-sized nickel and carbon are dispersed as discontinuous phases throughout a continuous phase of the silver. The nickel and silver having a Scherrer grain size less than about 5 nanometers. The electrodeposited coating provides prolonged fretting wear durability against fretting wear caused by microrubbing of the mating contacts at temperatures at least as high as 180° C. Preferably, the electrodeposited silver-nickel-carbon coating will have a nickel undercoating applied directly to the substrate before depositing the Ag—Ni—C coating to improve adhesion on stainless steel (SS) substrates, to provide a hard under layer for the Ag—Ni—C, and to provide an interdiffusion barrier between the Ag and a copper substrate. The nickel underlayer may be vapor-deposited, but will preferably be electrodeposited. Most preferably, the contact will also have a pure or alloyed silver topcoat applied atop the Ag—Ni—C coating to stabilize the contact resistance. Preferably, the nickel undercoating on copper substrates will have a thickness between about 0.1 micrometer and about 1 micrometer. On SS substrates, a nickel strike is sufficient. The silver topcoat will preferably have a thickness of about 0.1 micrometers to about 0.25 micrometers.

DESCRIPTION OF THE PREFERRED EMBODIMENT

Figure 1:
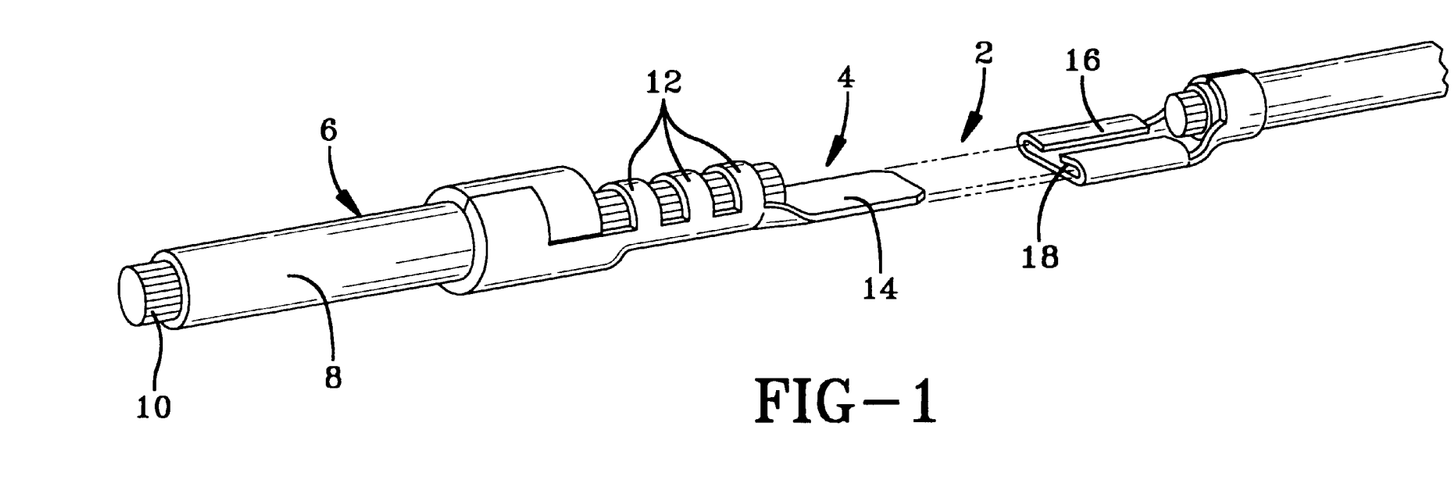
FIG. 1 is an isometric view of one type of nesting electrical connector to which the present invention is applicable.

The present invention is a silver-nickel-carbon nanocomposite coating for the mating contacts of a nesting electrical connector 2 such as shown in FIG. 1. The connector 2 has a blade-type male component/contact 4 configured to be attached (e.g., by crimping) to an electrical cable 6 having an insulating sheath 8 encasing wire strands 10. Fingers 12 of the connector 2 are crimped to secure, and electrically connect, the male contact 4 to the wire strands 10. At the opposite end of the connector 2, there is formed a blade or tongue 14 adapted to be received in a cooperating female contact component 16 having an opening 18 shaped so as to generally complement the shape of the blade or tongue 14, in accordance with conventional practice. For vehicular applications, the mutually engaging surfaces of the tongue 14 and female contact 16 should have a low coefficient of friction as well as prolonged fretting wear resistance and thermal stability at temperatures in excess of about 180° C. For copper contacts, each contact is first coated with nickel. The silver-nickel-carbon nanocomposite coating of the present invention is then electrodeposited onto the nickel layer from an aqueous electroplating bath. Preferably, the silver-nickel-carbon coating will then be overcoated with a thin layer of silver electrodeposited atop the silver-nickel-carbon layer to stabilize the contact resistance at a low level throughout the life of the Ag—Ni—C coating.

The nickel content of the electrodeposit varies between about 10 atomic percent and about 25 atomic percent, with a preferred concentration being about 15–20 atomic percent. Above about 25 atomic percent the coatings are not as effective as below that level and tend to fail earlier. Coatings having a nickel content below about 10 atomic percent are difficult, though not impossible, to plate. The carbon comprises about 5 atomic percent to about 15 atomic percent of the composite, is essentially amorphous (i.e., noncrystalline), has a particle size too small to measure using x-ray diffraction techniques, and is believed to come from dissociation of the cyanide component of the electroplating bath discussed hereinafter. The electroplated silver-nickel-carbon nanocomposite of the present invention is not an alloy, but rather is characterized by distinct, discrete islands or grains of nickel and carbon dispersed throughout a continuous phase of fine grain silver as determined using a Siemans Model D5000 x-ray diffractometer having a copper source tube and graphite monochromator. Raman spectroscopy analysis of the electrodeposited Ag—Ni—C coatings showed distinct silver peaks which broadened and attenuated as the percentage of Ni in the coatings increases. The same Raman technique also indicates that the carbon is graphitic in nature in that the carbon atoms are three-coordinated and are bound by $sp^2$ type hybrid orbitals. The addition of the nickel is seen to reduce the average silver grain size regardless of the composition of the substrate. Broad nickel lines are evident only when the x-ray curves are magnified above the level of the background noise which is indicative of the fact that the Ni grains are very small and dispersed throughout the silver. The grain sizes of the silver and nickel were calculated from the x-ray diffraction peak width using the known Scherrer technique which applies the Scherrer equation to the half width of the x-ray diffraction peaks, and indicates that the silver and nickel have an ultra fine grain size averaging less than about 5 nanometers. The Scherrer technique for determining grain size is well known in the art and is described in more detail, for example in Elements of X-ray Diffraction, Second Edition, B. D. Cullity, p. 284, Addison-Wesley Publishing Co. Inc., Reading, Mass. The Scherrer technique has demonstrated that vapor-deposited Ag—Ni coatings, ala Cheng et al., have a grain size greater than 5 nanometers, and most commonly in the range of about 10–15 nanometers. The finer grain size of the Ag—Ni—C electrodeposit of the present invention is believed to produce a harder coating than that produced by vapor deposition. Moreover, the presence of the carbon dispersed throughout the nanocomposite is believed to reduce the coefficient of friction between the rubbing contacts. It is believed that the low coefficient of friction (i.e. about 0.2–about 0.3) caused by the carbon, and the increased hardness caused by the small grain size, coact to increase the durability and prolong the useful life of the contacts, as determined by their ability to maintain a low contact resistance over a prolonged period of time at temperatures of at least 180° C.

Electrical connectors in accordance with the present invention are preferably electroplated from an agitated, room temperature, electroplating bath wherein the silver is complexed with cyanide ions, and the nickel complexed with pyrophosphate ions. More specifically, the electroplating bath comprises an aqueous solution of silver cyanide, potassium cyanide, nickel pyrophosphate and potassium pyrophosphate, and is preferably made up by mixing a premixed silver stock solution together with a premixed nickel stock solution. The final plating solution preferably comprises:

| | |
|---|---|
| silver cyanide | ca. 1 g/l to ca. 50 g/l |
| potassium cyanide | ca. 0.5 g/l to ca. 25 g/l |
| nickel pyrophosphate | ca. 1 g/l to ca. 31 g/l |
| potassium pyrophosphate | ca. 50 g/l to ca. 200 g/l |
| pH | ca. 9 to ca. 9.5 |
| workpiece EMF vs SCE | ca. 1100 mV to ca. 1500 mV cathodic |
| current density | ca. 2 to ca. 40 mA/cm$^2$ |

A presently preferred plating bath comprises:

| | |
|---|---|
| silver cyanide | ca. 1.2 g/l |
| potassium cyanide | ca. 0.6 g/l |
| nickel pyrophosphate | ca. 11.7 g/l |
| potassium pyrophosphate | ca. 78 g/l |
| pH | ca. 9.2 |
| workpiece EMF vs SCE | ca. 1200 to ca. 1300 mV cathodic |
| current density | ca. 5 to ca. 10 mA/cm$^2$ |

The concentration of the nickel in the deposit may be controlled by varying the potential applied to the plating cell. In this regard, at low plating potentials, substantially only silver deposits. However, at a workpiece cathodic potential of about 1100 mV (i.e., vs SCE reference) nickel begins to codeposit with the silver. Above this nickel deposition voltage threshold, the percentage nickel in the deposit increases as the applied potential increases (i.e., becomes more cathodic). The Ni content of the coating may also be varied by varying the ratio of the silver ions to the nickel ions in the plating bath. In this regard, as the ratio of the concentration of the silver to the concentration of the nickel in the bath increases, the nickel content of the deposit decreases. Moreover, the nickel content of the deposit may be varied by varying the temperature of the bath, with higher temperatures favoring lower nickel contents. Still further, as the potassium pyrophosphate concentration in the bath increases, the nickel content of the deposit increases. Finally, increasing the amount of bath agitation increases the silver content of the coating, and the rate of alloy deposition incident to increasing the mass transport. Alternative techniques for increasing the mass transport includes ultrasonic vibration or laser heating of the workpiece surface. The potential applied to the system will change as the amount of agitation changes in order to obtain the same Ag/Ni ratio in the deposit as is obtained from other degrees of agitation. Hence, the workpiece potential will be made more cathodic with increased agitation to obtain the same Ag/Ni as is obtained at a lower agitation rate. The potential applied to the system will also change to compensate for changes in both temperature and/or composition in order to achieve the same Ag/Ni ratio.

The silver-nickel-carbon composite has been deposited on, and used effectively on, 7025 copper alloy and 301 stainless steel. When using copper alloys, a layer of nickel is first deposited directly onto the copper, and the silver-nickel-carbon layer thereafter electrodeposited atop the nickel layer. The nickel (1) prevents any interdiffusion between the silver and copper at engine compartment temperatures, and (2) provides a harder underlayer than copper for the Ag—Ni—C layer which helps prolong the life of the Ag—Ni—C layer. For copper-based contacts, the nickel underlayer will preferably be electrodeposited from a conventional sulfamate nickel bath and will generally have a thickness ranging between about 0.1 micrometers to about 1.0 micrometers. A nickel coating will also preferably be deposited directly atop stainless steel contacts before electrodepositing the Ag—Ni—C layer. On stainless steel, however, only a nickel strike (i.e. about 0.25 $\mu$m) undercoating promotes adhesion of the Ag—Ni—C layer, and is preferably electrodeposited from a Woods type chloride bath.

Most preferably, a pure or alloyed silver overlayer or cap will be electrodeposited atop the silver-nickel-carbon layer to a thickness of at least about 0.1 microns. The silver cap serves to stabilize the contact resistance at a desirable low level throughout the useful life of the Ag—Ni—C coating, the end of which (i.e., useful life) is evident when in the contact resistance between two contacts that are rubbed together exceed a predetermined contact resistance (i.e. 10 mohms for copper contacts, and 30 mohms for SS contacts) in the cycle life test procedure to be described hereinafter in conjunction with tests performed on this invention. Without the silver cap, it has been observed that the contact resistance is erratic throughout life testing even though its excursions remain within an acceptable level. Precisely how the silver cap stabilizes the contact resistance is not known. It is believed, however, to function as a barrier that prevents oxidation of the nickel component of the nanocomposite. Whatever the mechanism, with the silver cap, the contact resistance stays low, and essentially constant, throughout the useful life of the silver-nickel-carbon coating. Silver thickness greater than about 0.25 microns are unnecessary to obtain the benefits set forth above.

A series of tests were conducted to evaluate the coating and the electroplating process for depositing it. A plating solution was made up by mixing (1) 95 ml of an aqueous silver stock solution comprising 25 g/l potassium cyanide and 50 g/l of silver cyanide with (2) 390 ml of an 80° C. aqueous nickel stock solution comprising 1.02/1 of potassium pyrophosphate and 248 g/l nickel pyrophosphate. This mixture was diluted to one liter with water so as to provide a finished plating solution having a pH of 9.2 and containing 5 gs $Ni^{++}$ and 1 g $Ag^+$. Ag—Ni—C coatings were deposited at room temperature onto copper, brass and stainless steel substrates which had been electrocleaned at 5–7 volts for one minute in a 70° C. solution (i.e., 60–75 g/l) of N326E from Benchmark, Inc. Each substrate was then rinsed and dipped in 10% sulfuric acid before coating. Plating was accomplished using a commercial Model ASR rotating-disk electrode (Pine Instrument Co.) for agitation control. Plating potentials were applied using a commercial PAR Model 273 potentiostat, with a platinum counterelectrode and a saturated calomel reference electrode separated from the plating solution by a salt bridge. Potentials were controlled at levels between 1100 mV and 1900 mV vs. a saturated calomel reference electrode (SCE). Coating thicknesses of 0.2–0.3 microns were achieved in plating times between 25 and 65 seconds. From these tests, it was determined that adherent Ag—Ni—C coatings could be deposited at the rate of about 0.25 micron/minute with nickel contents (i.e., in the coating) controllable between about 5 a/o to about 40 a/o, and that agitation (i.e., cathode rotation) was important for producing adherent coatings. The general performance of the plating system is shown in Table 1, which shows that for a fixed rotation rate (i.e., agitation), the nickel content of the coating increases as the workpiece potential becomes more cathodic, and at a fixed workpiece potential, the nickel content decreases as the rotation rate increases. Table 2 shows the specific performance of the plating system based on the rotating cathode tests.

TABLE 1

Electrodeposited Coatings from the Ag—Ni Pyrophosphate System: Impact of Agitation and Workpiece Potential

| Agitation Rate Workpiece Potential | 100 rmp | 500 rpm | 1000 rpm |
|---|---|---|---|
| 900 mV | Ag (100) Matte | Ag (100) Yellow-Gray | Ag Ni(<5) Matte |
| 1100 mV | Ag(100) Bright | Ag(100) Semibright | Ag(100) Semibright |
| 1300 mV | Ag (82) Ni (18) Bright | Ag (92) Ni (8) Bright | Ag (92) Ni (8) Bright |
| 1500 mV | Ag (78) Ni (22) Bright | Ag (83) Ni (17) Bright | Ag (86) Ni (14) Bright |

TABLE 2

Composition of Electrodeposited Ag—Ni Alloys in working Region

| Workpiece Potential (mV vs. NHE) | Plating Time (sec) | Current Density (mA/cm$^2$) | RPM | Ag (a/o) | Ni (a/o) | Measured Thickness ($\mu$m) | Calculated Thickness ($\mu$m) | Plating Efficiency |
|---|---|---|---|---|---|---|---|---|
| 1300 | 65 | 14.4 | 100 | 70.6 | 29.4 | 0.30 | 0.69 | 0.43 |
| 1300 | 43 | 21.7 | 500 | 82.1 | 17.9 | 0.25 | 0.80 | 0.31 |
| 1300 | 35 | 27.1 | 1000 | 88.2 | 11.3 | 0.28 | 0.82 | 0.32 |
| 1400 | 65 | 14.4 | 100 | 82.5 | 17.5 | 0.32 | 0.80 | 0.40 |
| 1400 | 35 | 27.1 | 1000 | 61.4 | 38.6 | 0.35 | 0.62 | 0.57 |
| 1500 | 39 | 26.4 | 100 | 59.4 | 40.6 | 0.22 | 0.65 | 0.34 |
| 1500 | 39 | 26.4 | 100 | 61.3 | 38.7 | 0.23 | 0.67 | 0.34 |
| 1500 | 28 | 34.0 | 500 | 77.5 | 22.5 | 0.20 | 0.77 | 0.26 |
| 1500 | 25 | 37.6 | 1000 | 81.0 | 19.0 | 0.32 | 0.79 | 0.40 |
| 1500 | 25 | 37.6 | 1000 | 80.7 | 19.3 | 0.29 | 0.79 | 0.37 |

In Table 2, the "calculated" thickness was computed on an assumed basis of 100% current efficiency, which, in reality, does not occur. In fact, electron probe analysis shows actual thicknesses to be about 0.2 to about 0.3 microns. The actual plating efficiency (i.e., about 30%–40%) was determined by (1) converting the total charge passed to an equivalent thickness (based on the measured Ag/Ni distribution in each deposit), and (2) dividing the measured thickness by the equivalent thickness.

In another series of tests, a plating solution was made up by mixing a premixed silver stock solution with a premixed nickel stock solution. Premixing stock solutions insures the complete dissolution of the salts. The silver stock solution was made up by dissolving 25 g of potassium cyanide in a liter of water, and then dissolving 50 g of silver cyanide into the potassium cyanide solution. The nickel stock solution was made up by mixing 3.6 kg of potassium pyrophosphate with 3.5 liters of water and heating to 80° C. until the salt was dissolved. Thereafter, 248 grams of nickel pyrophosphate was added in 50 gram increments such that each increment dissolved before adding the next to prevent the nickel pyrophosphate from forming gelatinous clumps. To make the plating solution, water was first added to the plating tank, followed by the desired amount of nickel stock solution and finally the desired amount of silver stock solution. The bath was mixed thoroughly, allowed to cool to room temperature, and had a nominal pH of 9. 1. The plating solution was held in a 20 liter polypropylene tank, and the connector contacts (i.e., copper alloy and 301 stainless steel) that were plated held on a silver-plated-copper, wire, plating rack having a dual coating of heat-cured XP2000 stopoff lacquer topcoat. A pair of soluble nickel anodes were positioned on opposite sides of, and spaced 13 cm from, the contacts. Solution flow through the tank was provided by two FLO-King laboratory series filtration-agitation units, each having a maximum throughput of 400 gph and one micron filter head porosity. Power was supplied by a Kocur 5C, 15 volt, 5 ampere rectified power supply. Cell current and voltage was monitored using AVO meters.

Before making samples, the current density was recorded throughout the range of applied potentials, and the region from pure silver to high-nickel content was mapped based on the deposit compositions at the different plating potentials. Coatings having nickel in the range 10 atomic percent (a/o) to 35 a/o were deposited at about 2 to about 4 mA/cm$^2$ current density and were darker in appearance than those plated at about 1 mA/cm$^2$ (i.e., pure silver) apparently due to oxidation of the nickel. Current densities above about 4 mA/cm$^2$ produced microcracked coatings having nickel contents above 35%. Current densities below about 2 mA/cm$^2$ yielded a fine grain, but pure silver, deposit. For the test samples, a target thickness was set at about 0.5 $\mu$m (micrometer), though the actual thickness for each sample varied somewhat and was actually determined by calculation based on the current efficiency experienced for each sample. The current efficiency generally decreases as the current density increases. The 301 stainless steel samples had a Woods nickel strike undercoating applied thereto before depositing the Ag—Ni—C layer. Some of the copper samples had an underlayer of sulfamate nickel, while other copper samples had no such underlayer. The copper substrates were cleaned cathodically for 60 seconds at 5 volts in Benchmark N326E, rinsed in water and then dipped in a cathodic sulfuric acid activator bath (Udyprep 345) for 10 seconds at 5 volts. The stainless steel, on the other hand, was dipped in JCL for 60 seconds following the sulfuric acid dip, and immediately thereafter struck with nickel for 60 seconds at 1 A/sq. in. in the Watt's nickel strike bath. The coating's composition and thickness was determined by electron probe analysis. Using the so-called "Waldo" technique which combines (1) a model for the depth distribution of characteristic x-rays excited by the electron microprobes with (2) a computerized iteration technique. The Waldo technique is described in more detail in R. A. Waldo Microbeam Analysis, edited by D. E. Newbury, p. 310, San Francisco Press, San Francisco, Calif. (1988).

Test samples were tested for their high temperature durability in a test designed to simulate the expansion and contraction of the contacts, and consequent micro-rubbing thereof, in a vehicle engine compartment as it heats and cools. In that test, two flat samples were prepared. One of the samples had a 3 mm diameter dimple formed therein. The dimple was biased against the surface of the other flat sample with a load of 1 Newton, and reciprocated to and fro (i.e. up and back is one test cycle) over a 300 micron long track at a frequency of 0.013 Hz. Relative movement of the samples is momentarily stopped every 60 microns (i.e. 10 stops/cycle). Movement of the dimple was also stopped for 77 seconds between each complete cycle to allow for oxidation to occur. The samples were electrically connected together so that a constant current flowed therethrough. Voltage was measured each time the samples stopped and the resistance through the samples (herein referred to as the contact resistance) calculated therefrom. The test was run at 180° C. in air and the contact resistance of the coating determined, as set forth above, until failure occurred which was manifested by an increase in the maximum contact resistance to a level above 10 mohms for copper contacts or 30 mohms for stainless steel contacts, which are considered to be the maximum acceptable resistance for such contacts.

Figure 2:
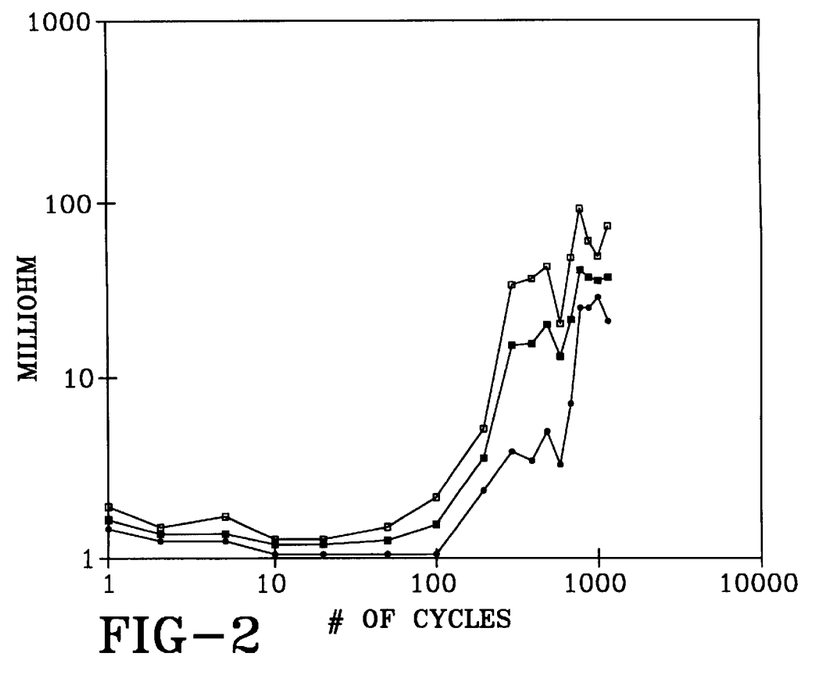
FIGS. 2–5 are durability (i.e., cycle life) curves for certain vapor deposited silver-nickel coatings.
Figure 3:
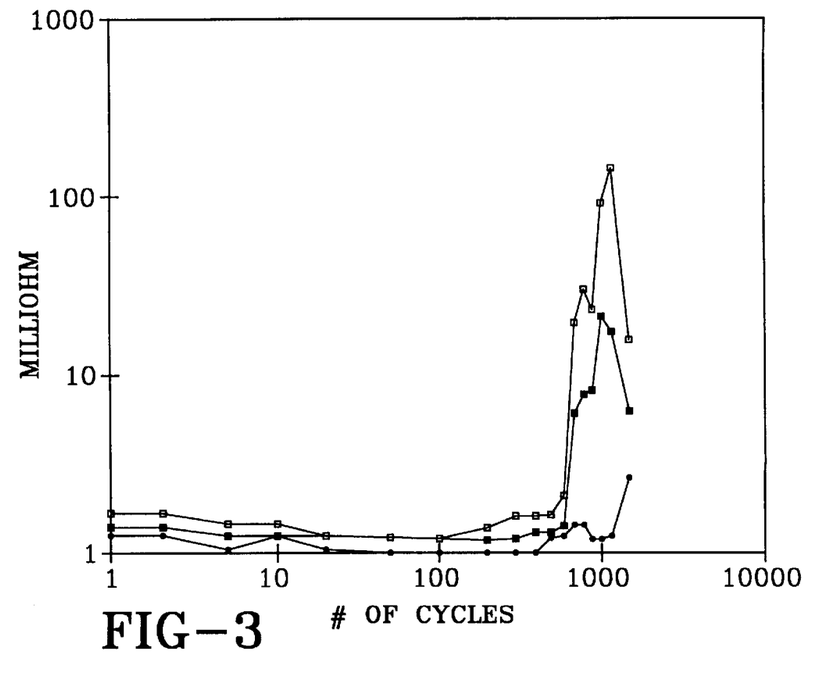
Figure 4:
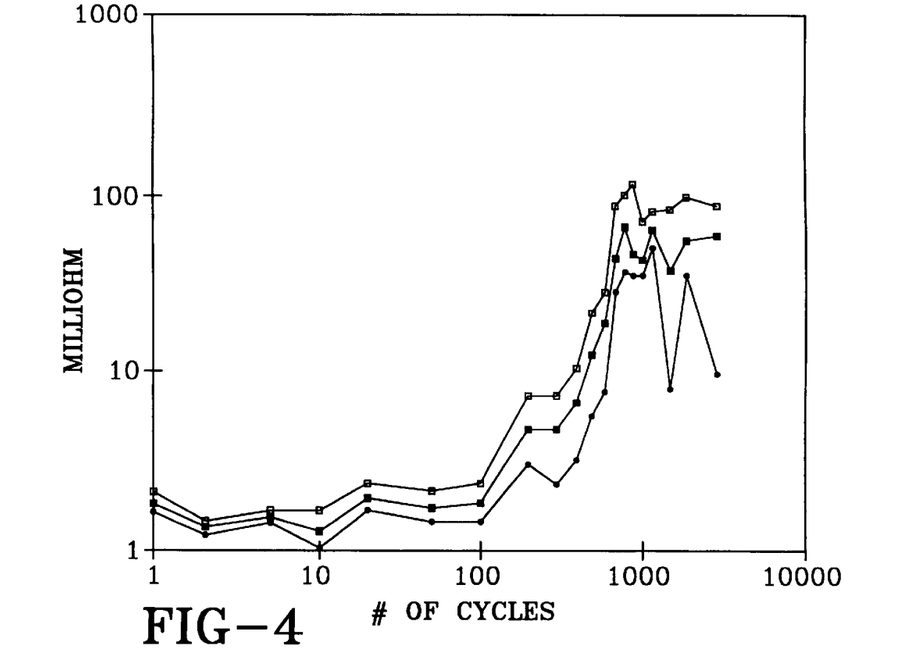
Figure 5:
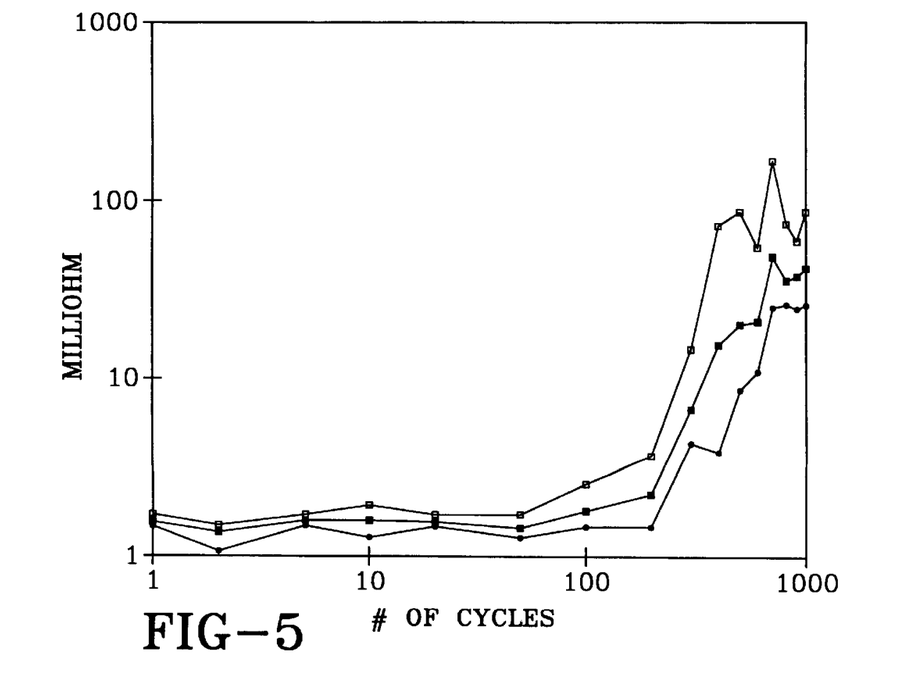
Figure 6:
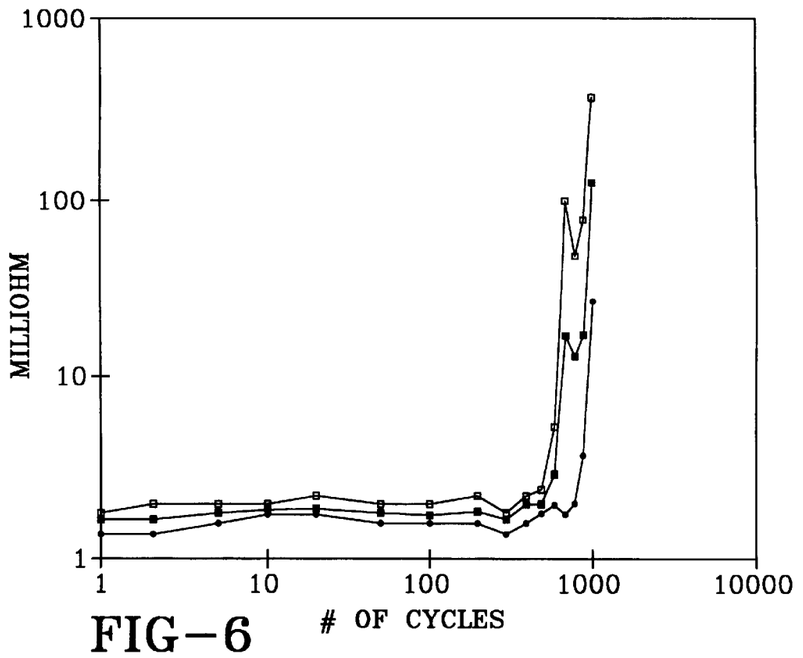
FIGS. 6–12 are durability (i.e., cycle life) curves for certain electrodeposited silver-nickel-carbon coatings having a nickel undercoating.
Figure 7:
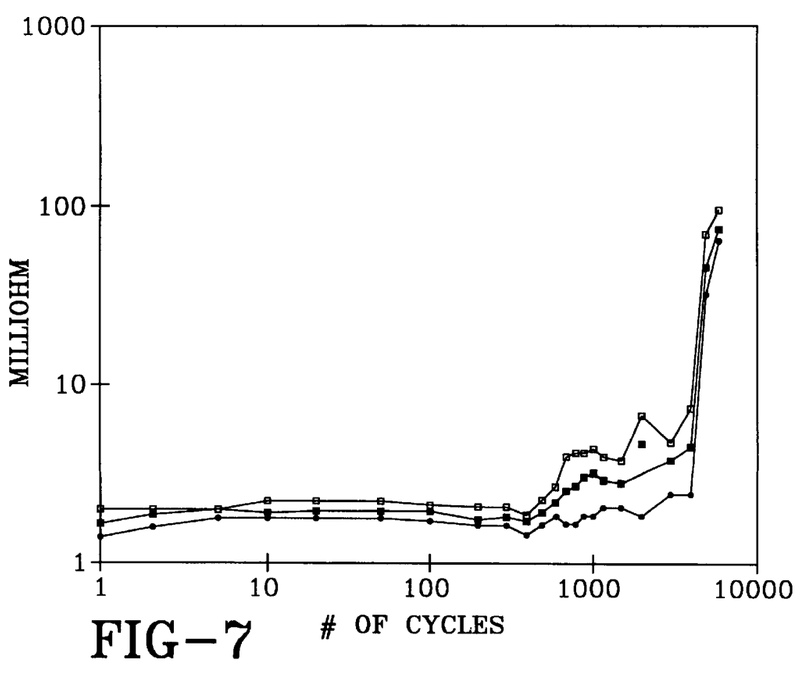
Figure 8:
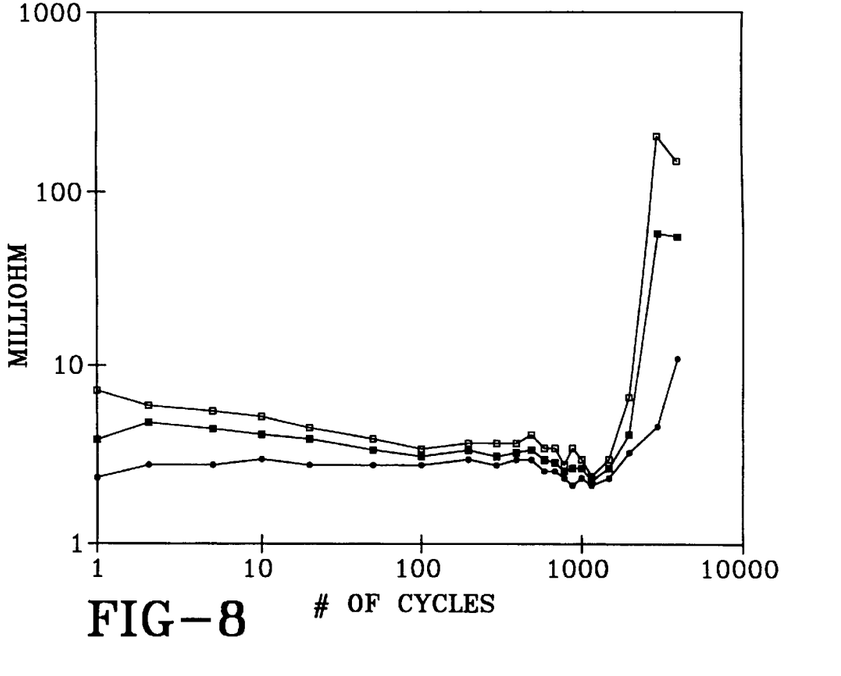
Figure 9:
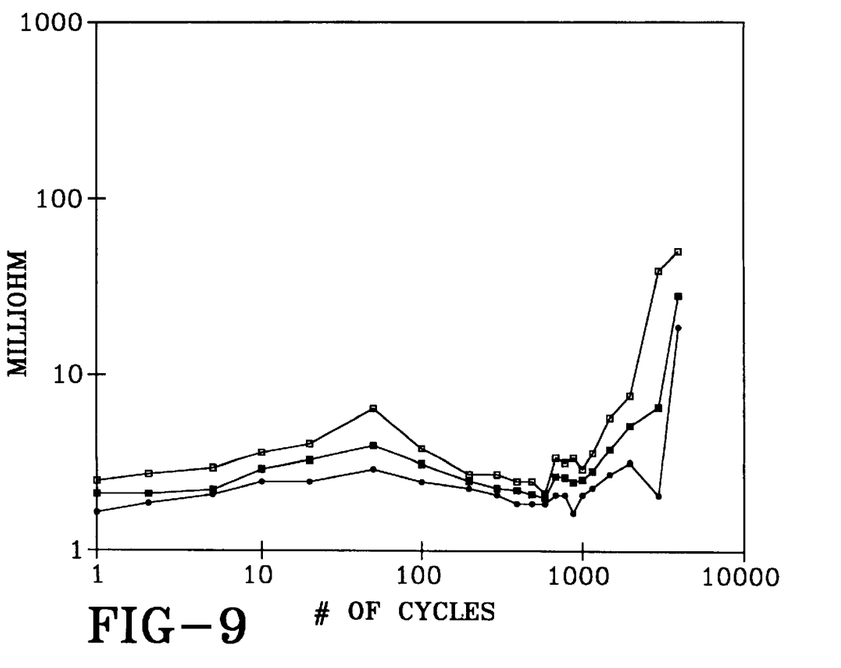
Figure 10:
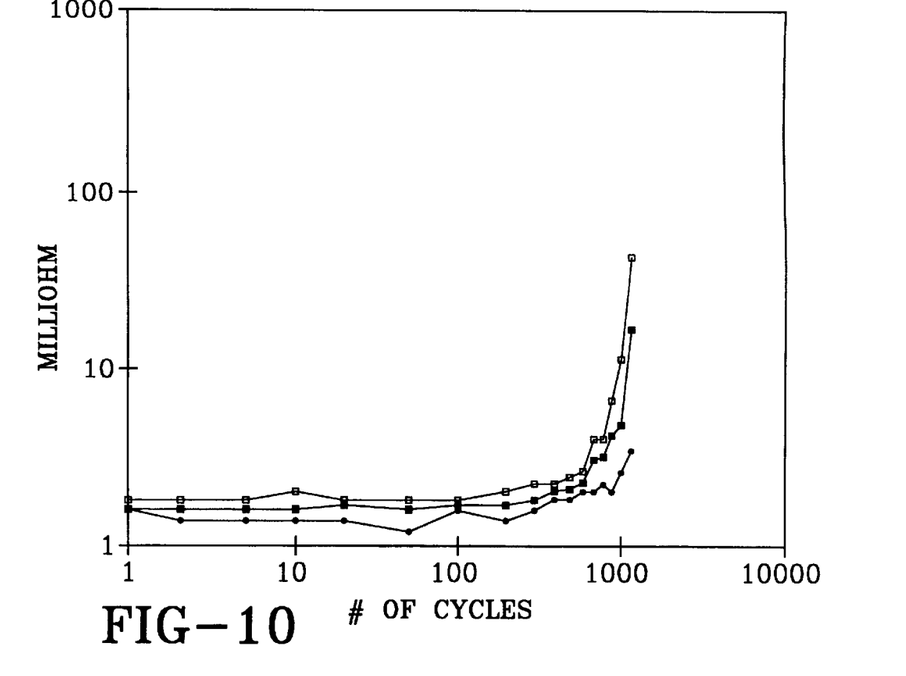
Figure 11:
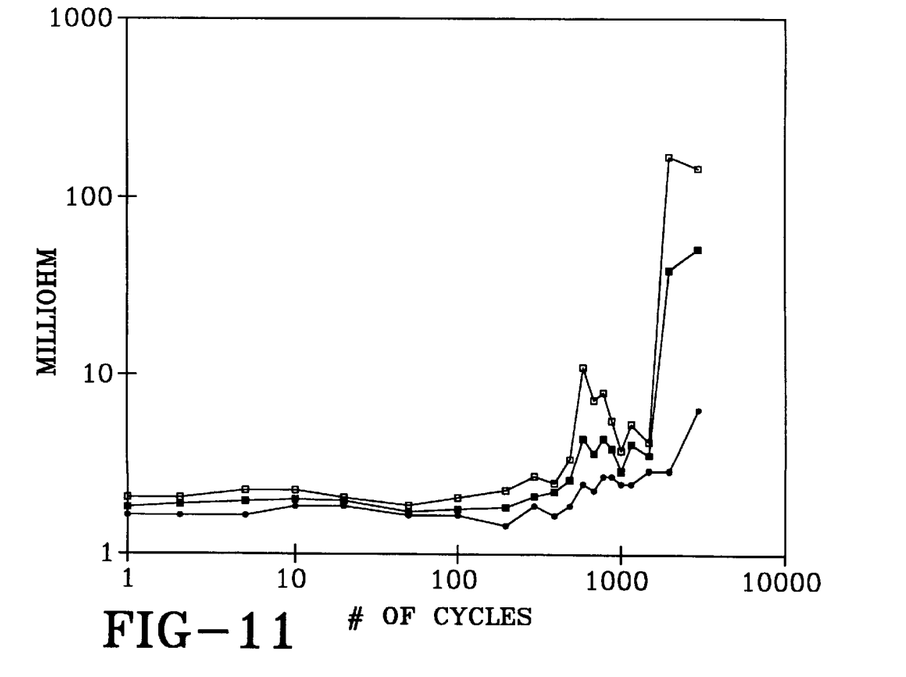
Figure 12:
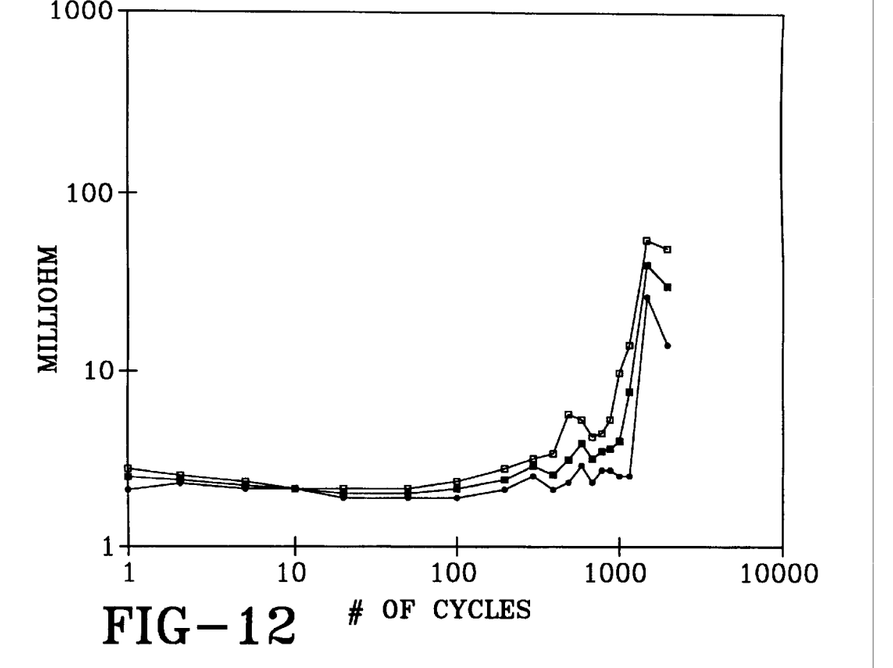

The results of those tests are shown in FIGS. 2–12, wherein (1) the curves plotted from the data points indicated by open squares correspond to the maximum contact resistance (plotted on the abscissa) obtained at a particular cycle (plotted on the ordinate), (2) the curves plotted from the data points indicated by the dots correspond to the minimum resistance obtained at a particular cycle, and (3) the curves plotted from the points indicated by the solid squares are the average of the maximum and the minimum values for each cycle. FIG. 2 shows that 0.8 $\mu$m of vapor-deposited silver nickel composite (i.e., containing 10 a/o nickel) capped with 0.2 $\mu$m of pure silver deposited directly (i.e., no Ni underlayer) onto C7025 copper alloy lasted about 230 cycles until failure (i.e., first exceeds 10 milliohms contact resistance). FIG. 3 shows that another sample similar to that tested in connection with FIG. 2 lasted about 670 cycles before failure. FIG. 4 shows that another sample similar to those tested in connection with FIGS. 2 and 3, but with 15 a/o nickel lasted about 400 cycles. FIG. 5 shows that another sample similar to that tested in connection with FIG. 4 lasted about 270 cycles until failure. FIG. 6 shows that 0.43 $\mu$m of Ag—Ni—C containing 20 a/o Ni and about 10 a/o C which was electrodeposited atop a 0.4 $\mu$m underlayer of Ni, and capped with 0.1 $\mu$m of pure silver lasted about 620 cycles before failure. FIG. 7 shows that 1.41 $\mu$m of Ag—Ni—C containing 20 a/o Ni and about 10 a/o C which was electrodeposited atop a 0.2 $\mu$m underlayer of Ni, and capped with 0.1 $\mu$m of pure silver lasted about 4200 cycles. FIG. 8 shows that another sample similar to that tested in connection with FIG. 7 lasted about 2200 cycles before failure. FIG. 9 shows that 0.96 $\mu$m of Ag—Ni—C containing 20 a/o Ni and about 10 a/o C which was electrodeposited atop a 0.7 $\mu$m underlayer of Ni, and capped with 0.1 $\mu$m of pure silver lasted about 2200 cycles before failure. FIG. 10 shows that 0.95 $\mu$m of Ag—Ni—C containing 20 a/o Ni and about 10 a/o C which was electrodeposited atop a 0.2 $\mu$m underlayer of Ni, and capped with 0.1 $\mu$m of pure silver lasted about 1000 cycles before failure. FIG. 11 shows that 0.95 $\mu$m of Ag—Ni—C containing 20 a/o Ni and about 10 a/o C which was electrodeposited atop a 0.3 $\mu$m underlayer of Ni, and capped with 0.1 $\mu$m of pure silver lasted about 1700 cycles before failure . FIG. 12 shows that 1.0 $\mu$m of Ag—Ni—C containing 20 a/o Ni and about 10 a/o C which was electrodeposited atop a 0.92 $\mu$m underlayer of Ni, and capped with 0.1 $\mu$m of pure silver lasted about 1100 cycles before failure. Collectively, these data show that much thinner layers of electrodeposited Ag—Ni—C coatings supported on an underlayer of nickel have significantly longer useful lives than thicker vapor-deposited samples having no nickel underlayment.

Figure 13:
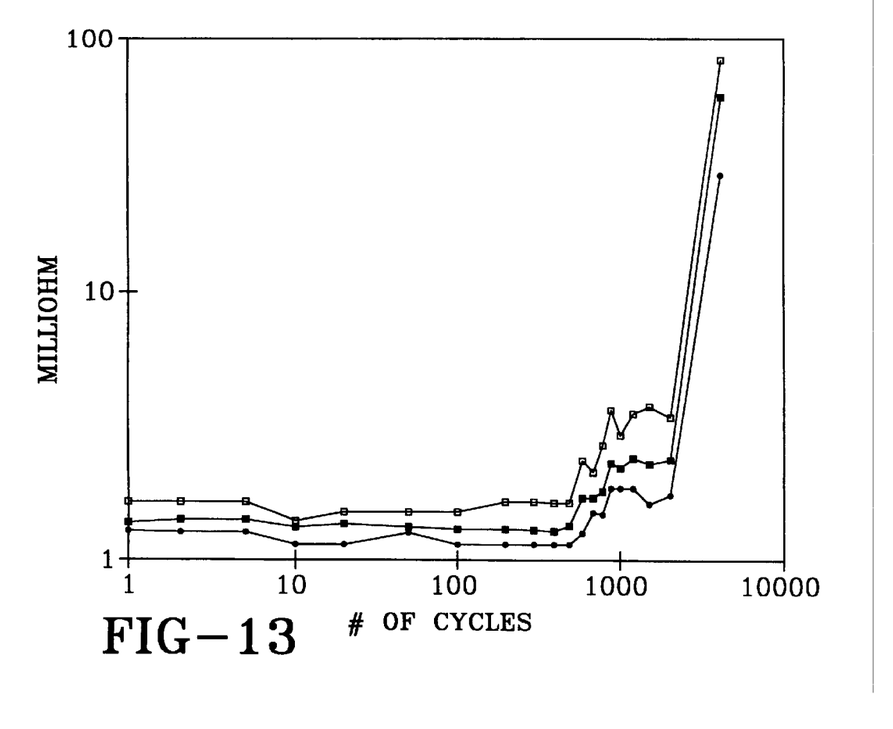
FIG. 13 is a durability (i.e., cycle life) curve for electrodeposited Ag—Ni—C coatings with the same nickel content as the vapor-deposited samples whose durability is shown in FIGS. 2 and 3.

FIG. 13 shows that 0.8 $\mu$ of Ag—Ni—C containing 11 a/o Ni and about 10 a/o C electrodeposited directly (i.e., no Ni underlayer) atop a 7025 copper alloy and capped with 0.2 $\mu$ of pure silver lasted about 2400 cycles before failure. Hence the electroplated Ag—Ni—C samples significantly out lived vapor deposited samples, having substantially the same nickel content and silver cap—see FIGS. 2 & 3.

Figure 14:
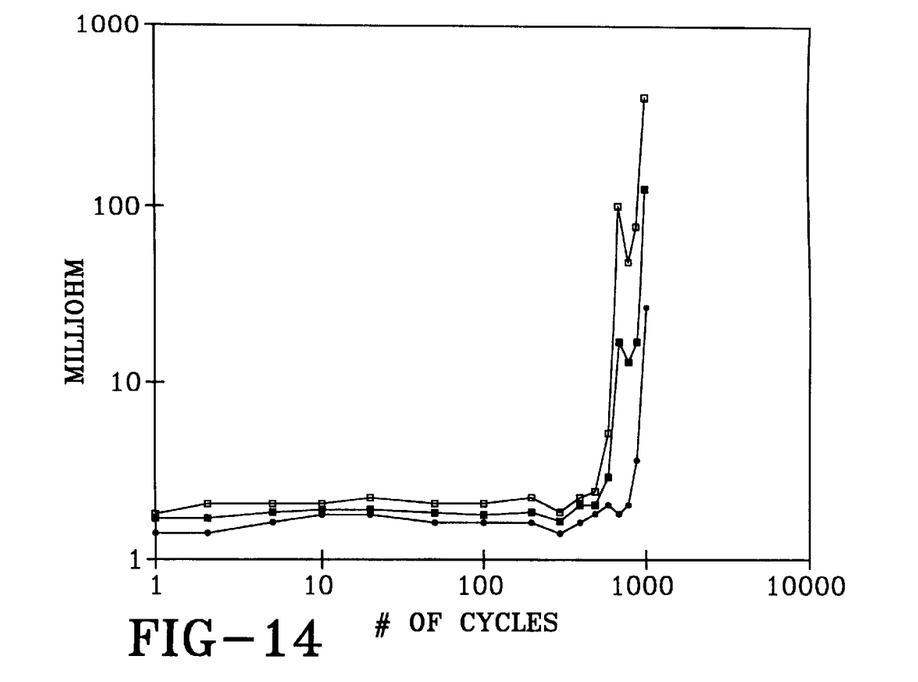
FIGS. 14 and 15 are life-cycle life plots showing the contact resistance stabilizing affect of a silver cap atop the Ag—Ni—C coating.
Figure 15:
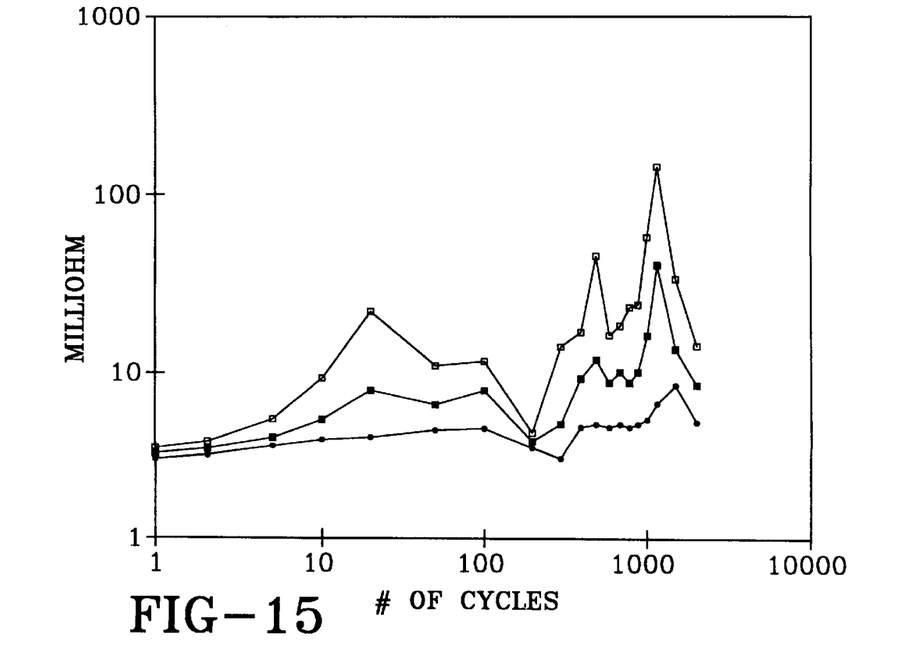

FIGS. 14 and 15 show the beneficial effects of a pure silver in maintaining a low constant contact resistance until failure. FIG. 14 shows the contact resistance measured, as above, for a sample having an electroplated 0.43 $\mu$m Ag—Ni—C coating containing 20 a/o Ni and about 10 a/o C over a 0.4 $\mu$m Ni underlayer and capped with a 0.1 $\mu$m top layer of silver electrodepositd atop the Ag—Ni—C layer. FIG. 14 shows that the contact resistance remained low and constant to failure at about 620 cycles. FIG. 15 shows the erratic behavior, and early failure (i.e. ca. 25 cycles), of a sample similar to that tested in FIG. 14 (i.e. 0.4 $\mu$m Ag—Ni—C), but without a Ag cap. It is evident from FIGS. 14 & 15 that, essentially everything else being equal, the silver top layer stabilizes the contact resistance at a low level until failure occurs.

Electrodeposited Ag—Ni—C coatings (i.e., ca. 0.3 $\mu$m–ca. 0.4 $\mu$m thick) containing about 10 a/o Ni deposited on the copper alloy contacts maintained an average contact resistance of less than 10 mohms for about 900 cycles. The wear scar left by the tester was quite small, and considerable silver remained in the scar even after 2000 cycles. On stainless steel samples, contact resistance remained below 30 milliohms for 1000 cycles and the wear scar revealed no change in silver content from the beginning of the test to the end. Coatings (i.e., 0.3 $\mu$m–0.4 $\mu$m thick) containing 30 a/o nickel deposited on copper substrates had very high initial contact resistance due to the presence of nickel and possibly nickel oxide. This initially high contact resistance dropped after about ten wipe cycles removed the oxides, and remained below 10 mohms for about 200 cycles, and thereafter quickly rose into unsatisfactory territory. It is believed that above about 30 a/o Ni the Ag—Ni—C coating has a native oxide that is removed in early cycling, but soon either reforms or acts as an abrasive that quickly wears away the coating. A similar, though not quite as drastic, phenomena is observed for coating on the stainless steel substrates.

Generally speaking, the electroplated Ag—Ni—C coatings of the present invention offer all of the benefits of the vapor deposited Ag—Ni coatings, but surprisingly have almost 2 to 3 times the high temperature wear resistance of samples coated with vapor-deposited Ag—Ni .

While the invention has been described primarily in terms of specific embodiments thereof, it is not intended to be limited thereto but rather only to the extent set forth hereafter in the claims which follow.

We claim:

1. A nesting electrical connector including a pair of mating electrical contacts each comprising a metal substrate having a silver-nickel-carbon electrodeposit thereon wherein: (a) said electrodeposit has a thickness of at least about 0.5 micrometer, (b) said nickel (i) comprises about 10 atomic percent to about 25 atomic percent of said composite, (ii) is dispersed as a discontinuous phase throughout a continuous phase of said silver, and (iii) has a Scherrer grain size less than about 5 nanometers; and (c) said carbon has a non-crystalline graphitic structure and comprises about 5 atomic percent to about 15 atomic percent of said composite.

2. A nesting electrical connector including a pair of mating electrical contacts each comprising: (1) a metal substrate; (2) a first layer of nickel adhering to said substrate; (3) a second layer of electrodeposited silver-nickel-carbon adhering to said first layer, said second layer having a thickness of at least about 0.5 micrometer and comprising a composite wherein said nickel (i) comprises about 10 atomic percent to about 25 atomic percent of said composite, (ii) is dispersed as a discontinuous phase throughout a continuous phase of said silver, and (iii) has a Scherrer grain size less than about 5 nanometers, and said carbon comprises about 5 atomic percent to about 15 atomic percent and has a non-crystalline structure; and (4) a third layer of electrodeposited silver adhering to said second layer and having a thickness of at least about 0.1 micrometer.

3. A nesting electrical connector including a pair of mating electrical contacts each comprising: (1) a copper alloy substrate; (2) a first layer of electrodeposited nickel adhering to said substrate and having a thickness of about 0.1 micrometer to about 1 micrometer; (3) a second layer of electrodeposited silver-nickel-carbon adhering to said first layer, said second layer having a thickness of about 0.5 micrometer to about 2 micrometer and comprising a composite wherein said nickel (i) comprises about 10 atomic percent to about 25 atomic percent of said composite, (ii) is dispersed as a discontinuous phase throughout a continuous phase of said silver, and (iii) has a Scherrer grain size less than about 5 nanometers, and said carbon comprises about 5 atomic percent to about 15 atomic percent of said composite, and has a non-crystalline graphite structure; and (4) a third layer of electrodeposited silver adhering to said second layer and having a thickness of at least about 0.1 $\mu$m.

* * * * *